(12) United States Patent
Castle et al.

(10) Patent No.: US 11,522,694 B2
(45) Date of Patent: Dec. 6, 2022

(54) ACOUSTICAL PHYSICALLY UNCLONABLE FUNCTION (PUF) AND SYSTEM

(71) Applicant: LEXMARK INTERNATIONAL, INC., Lexington, KY (US)

(72) Inventors: Scott Richard Castle, Lexington, KY (US); Alexander Lloyd Chapman, Lexington, KY (US); Keith Bryan Hardin, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 144 days.

(21) Appl. No.: 17/184,173

(22) Filed: Feb. 24, 2021

(65) Prior Publication Data

US 2021/0266159 A1    Aug. 26, 2021

Related U.S. Application Data

(60) Provisional application No. 62/981,350, filed on Feb. 25, 2020.

(51) Int. Cl.
| | | |
|---|---|---|
| *H01L 41/00* | (2013.01) | |
| *H04L 9/08* | (2006.01) | |
| *H04L 9/32* | (2006.01) | |
| *G10K 11/00* | (2006.01) | |
| *H02N 2/00* | (2006.01) | |

(52) U.S. Cl.
CPC .......... *H04L 9/0866* (2013.01); *G10K 11/002* (2013.01); *H04L 9/3278* (2013.01)

(58) Field of Classification Search
CPC ....... H04L 9/0866; H04L 9/3278; G09C 1/00; G10K 11/002; H04R 17/00
See application file for complete search history.

(56) References Cited

U.S. PATENT DOCUMENTS

| | | | | |
|---|---|---|---|---|
| 5,591,372 | A * | 1/1997 | Venkataramani ... | H01L 41/1876 501/137 |
| 9,502,023 | B2 * | 11/2016 | Li ........................ | H01L 41/0825 |
| 2014/0184022 | A1 * | 7/2014 | Kobayashi ............ | B06B 1/0662 29/25.35 |
| 2015/0371687 | A1 * | 12/2015 | Barnes ................... | G10K 11/00 365/51 |
| 2016/0199031 | A1 * | 7/2016 | Lee ...................... | A61B 8/4444 600/459 |
| 2017/0202539 | A1 * | 7/2017 | Kim ...................... | B23K 35/262 |
| 2018/0040805 | A1 * | 2/2018 | Motoki .................. | H01L 41/09 |
| 2018/0190896 | A1 * | 7/2018 | Wu ........................ | H01L 41/29 |

(Continued)

*Primary Examiner* — Gary S Gracia

(57) ABSTRACT

The present invention is a diverse acoustical object containing a range of particles that have acoustical wave impedances that are substantially different from the binder. The particles create a substantially different reflection as an acoustic wave is scattered by the particles. A negative reflection is created when the scattered wave is from a particle that has a wave impedance that is substantially less than the binder impedance. Practically, it may be necessary to encase this material in a thin material that will withstand the fabrication process (e.g., air or silicone elastomer could be encased in glass). If the wavelength is large compared to the encasing material thickness, then the reflection will be more dependent on the interior material. A mixture of materials that generate positive as well as negative reflections within the binder would add to the complexity of the PUF.

14 Claims, 8 Drawing Sheets

(56) References Cited

U.S. PATENT DOCUMENTS

2020/0253582 A1\* 8/2020 Nakai .................. A61B 8/4444
2020/0255652 A1\* 8/2020 Hamada ............. G01N 29/2437
2021/0266159 A1\* 8/2021 Castle .................. G10K 11/002

\* cited by examiner

ACOUSTICAL PHYSICALLY UNCLONABLE FUNCTION (PUF) AND SYSTEM

CROSS REFERENCES TO RELATED APPLICATIONS

This application claims priority and benefit under 35 U.S.C. 119(e) from U.S. provisional application No. 62/981,350 titled "Acoustical Physically Unclonable Function (PUF) and System," having a filing date of Feb. 25, 2020 and U.S. provisional application No. 63/507,581, titled "Combination Magnetic and Capacitive Sensor," filed on Sep. 2, 2020.

BACKGROUND

1. Field of the Invention

This invention relates generally to an acoustical physically unclonable function that is a combination of a binder and various particles with various acoustical impedances that create a unique acoustic object.

2. Description of the Related Art

Several different available technologies may be used to measure an acoustical PUF object. The sensors discussed in "Ultrasonic Fingerprint Sensor Using a Piezoelectric Micromachined Ultrasonic Transducer Array Integrated With Complementary Metal Oxide Semiconductor Electronics," by Y. Lu, H. Tang, S. Fung, Q. Wang, J. M. Tsai, M. Daneman, B. E. Boser, and D. A. Horsley, Applied Physics Letters 106, 263503 (2015); U.S. Pat. No. 8,601,876, titled "Ultrasonic Fingerprint Scanning Using a Plane Wave"; and U.S. Pat. No. 9,424,456, titled "Ultrasonic Fingerprint Authentication Based on Beam Forming" are applicable to make the needed measurements. The structures of these devices can also be used to measure other characteristics like the relative capacitance along the surface, and a map of the interior of the solid beneath the surface.

SUMMARY OF THE INVENTION

Disclosed is an acoustical PUF that is a combination of a binder and various particles with various acoustical impedances that creates a unique acoustic object. The form factor can be measured by a surface acoustical transceiver array. The authentication of valuable assets is an important problem to many industries. This invention adds extra layers of complexity to creating a cloned device.

The present invention uses the acoustic properties of variously shaped particles with varying density and velocities of propagations that are randomly distributed in a matrix binder to form a Physically Unclonable Function (PUF) object. It is to be understood that PUF in this invention relates to a physical object that has various characteristics that are measurable by a sensor. The characteristics are created using a randomization process that is easy to create with various manufacturing processes but very difficult to intentionally reproduce by any means. This matrix is formed into an object whose surface is available to be measured by an acoustic transducer. The transducer measures the response of an acoustic wave passing from sources to receivers. The preferred implementation has an array of sources and receivers (of a sufficient number) distributed over a surface to resolve a high spatial order of uniqueness from the PUF. These sources and receivers may be collocated into transceivers or dedicated sources with separated receivers. The random nature of the acoustic wave scattering through the PUF object creates a uniqueness that will be extremely difficult to replicate. This PUF object is then used as a highly unique and difficult-to-clone device that may be used to authenticate a valuable product or entity.

BRIEF DESCRIPTION OF THE DRAWINGS

Figure 1:
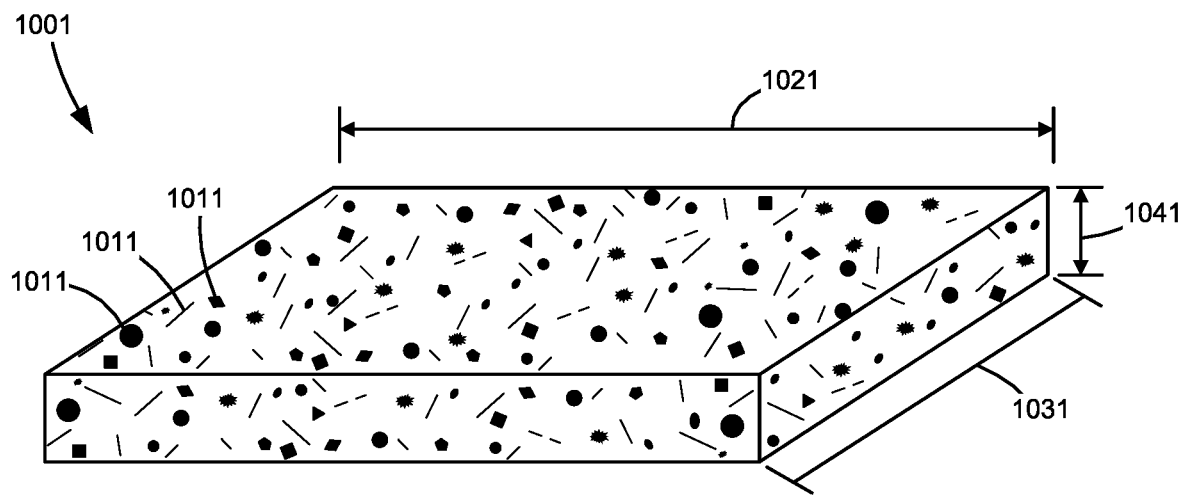

Having thus described the invention in general terms, reference will now be made to the accompanying drawings, which are not necessarily drawn to scale, and wherein:

FIG. 1 shows an acoustical PUF binder with varying impedance particles creating a matrix.

Figure 2:
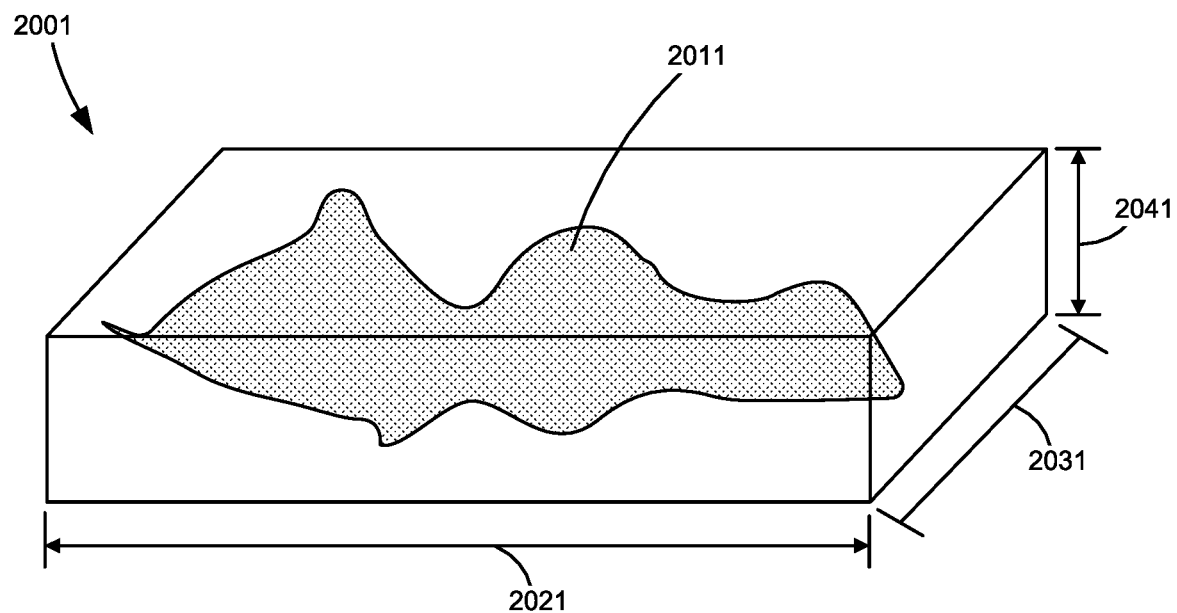

FIG. 2 shows a bounding box for a fractured glass particle.

Figure 3:
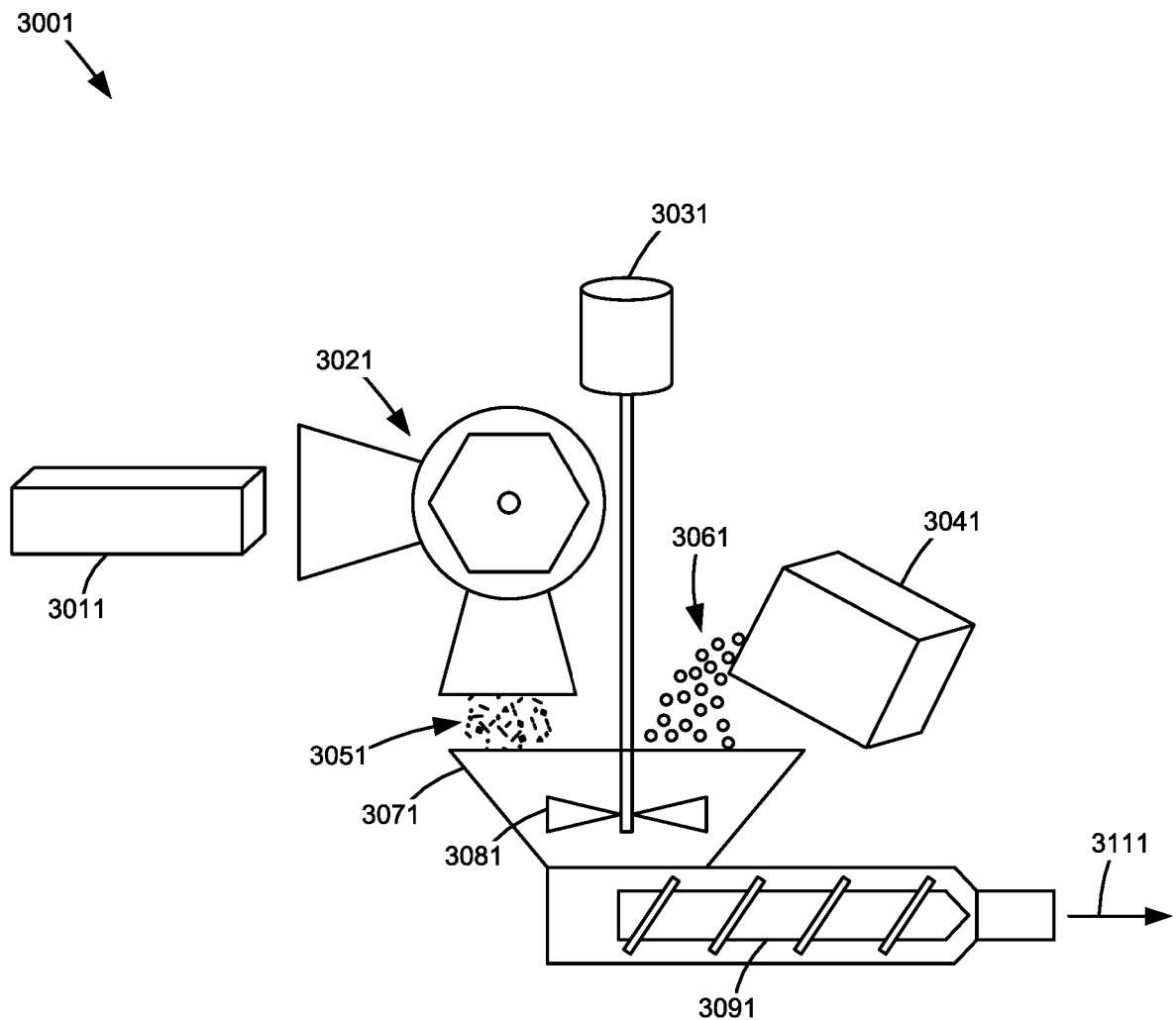

FIG. 3 shows a manufacturing process to create acoustic PUF matrix.

Figure 4:
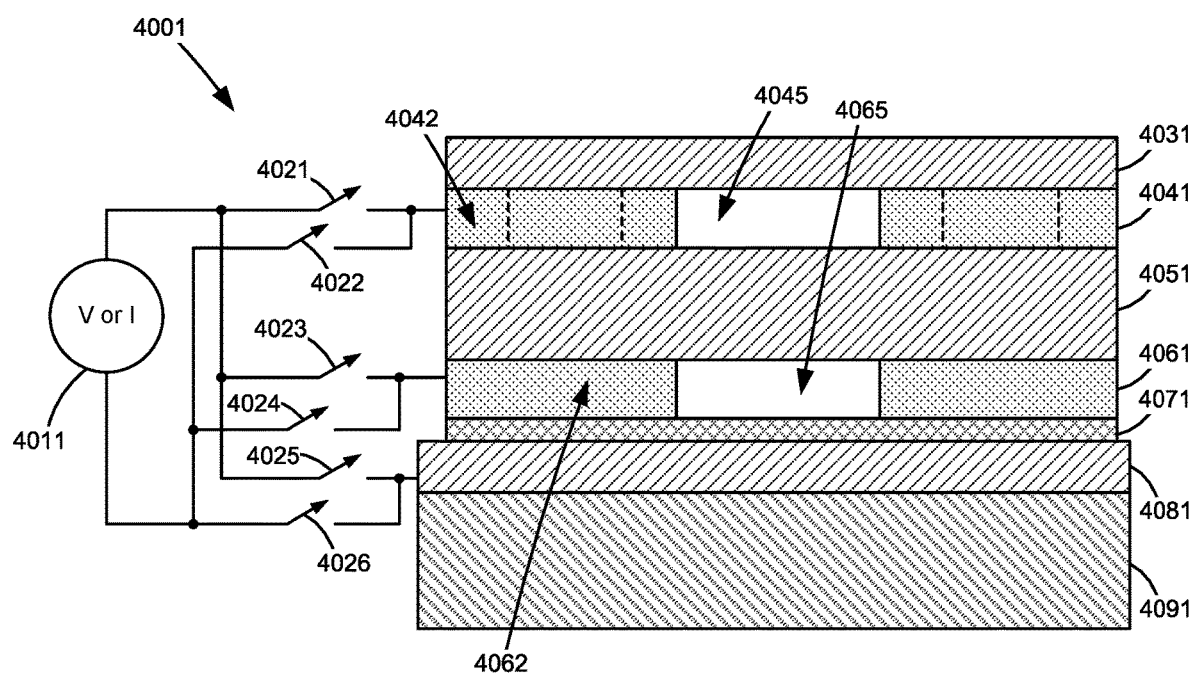

FIG. 4 shows a cross section of a piezoelectric material with a conducting Hall plate above and capacitive conductor below forming a combined acoustic component.

Figure 5:
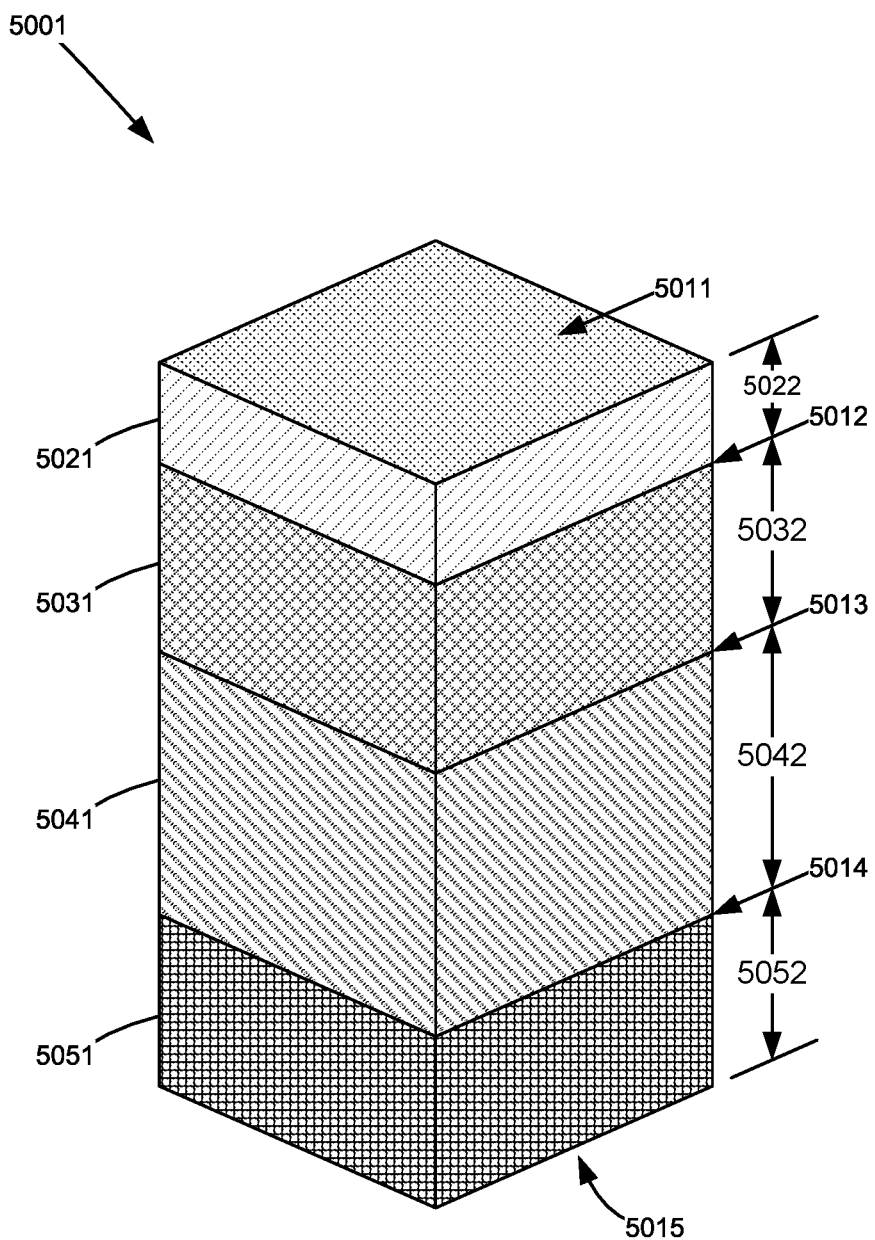

FIG. 5 shows multiple layers of a Hall Plate/Piezoelectric Material/Conductor Dielectric "Sandwich".

Figure 6:
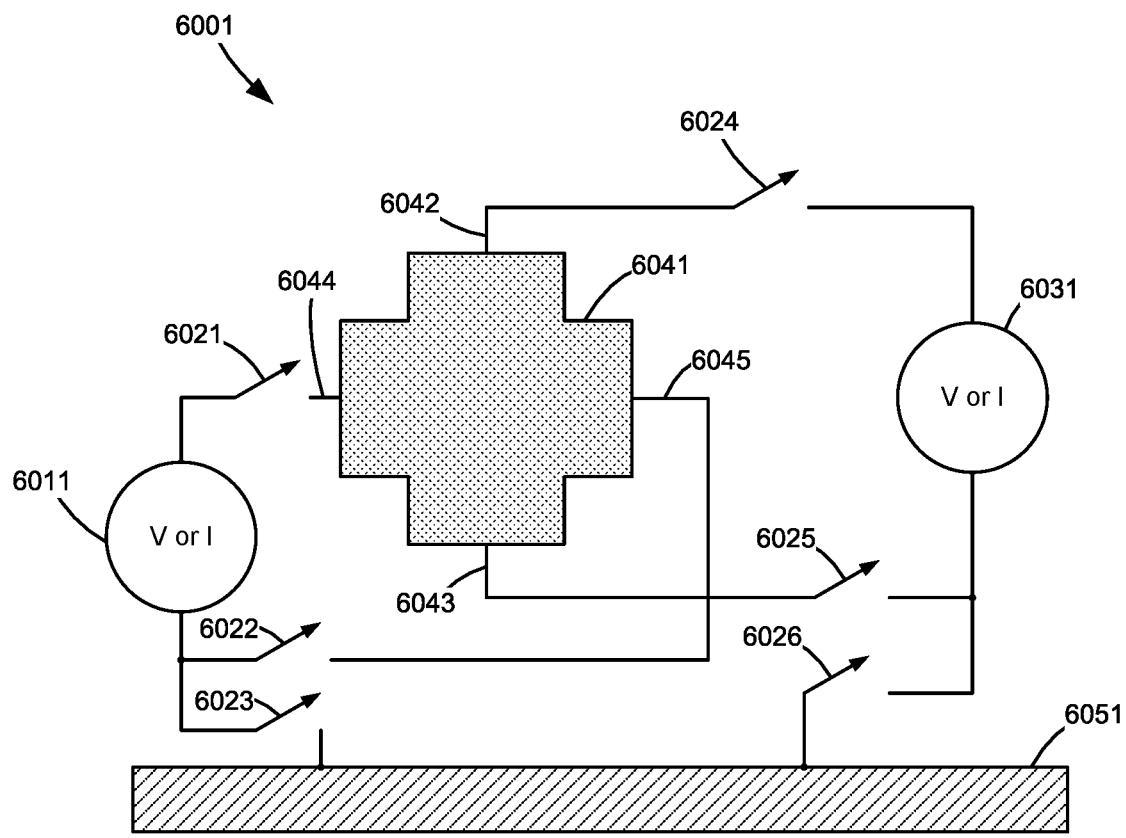

FIG. 6 shows a schematic of a Hall plate that is excited and measured for finding the magnetic field by closing switches.

Figure 7:
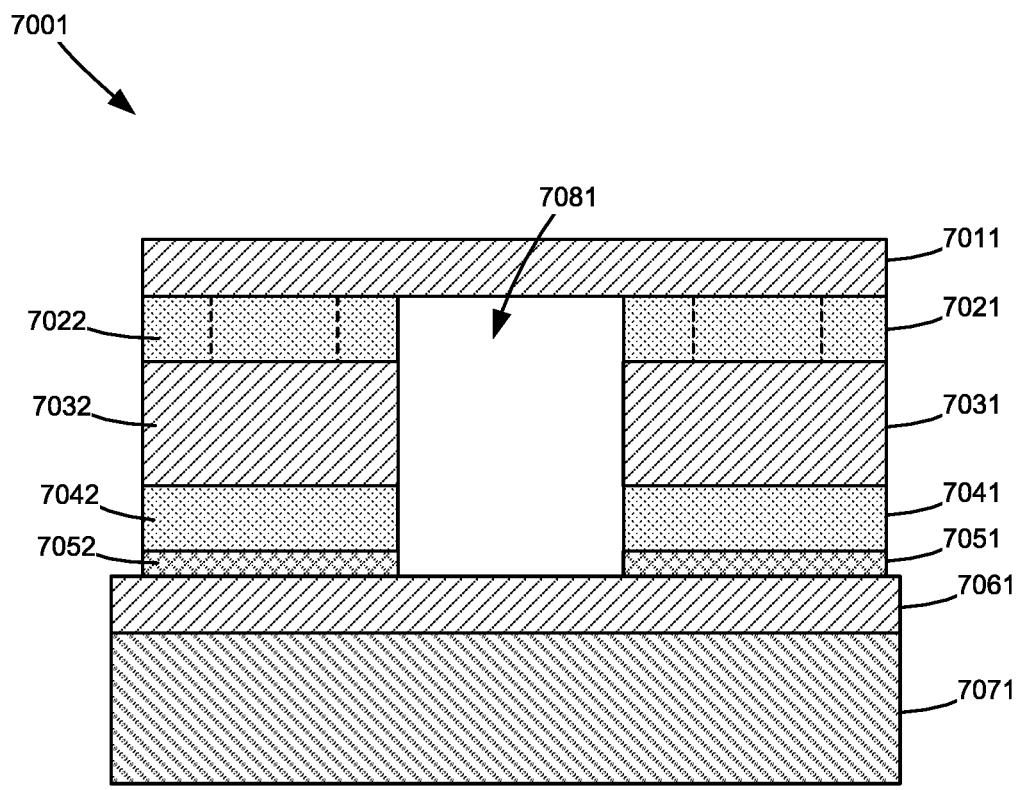

FIG. 7 shows a combination sensor with isolation section.

Figure 8:
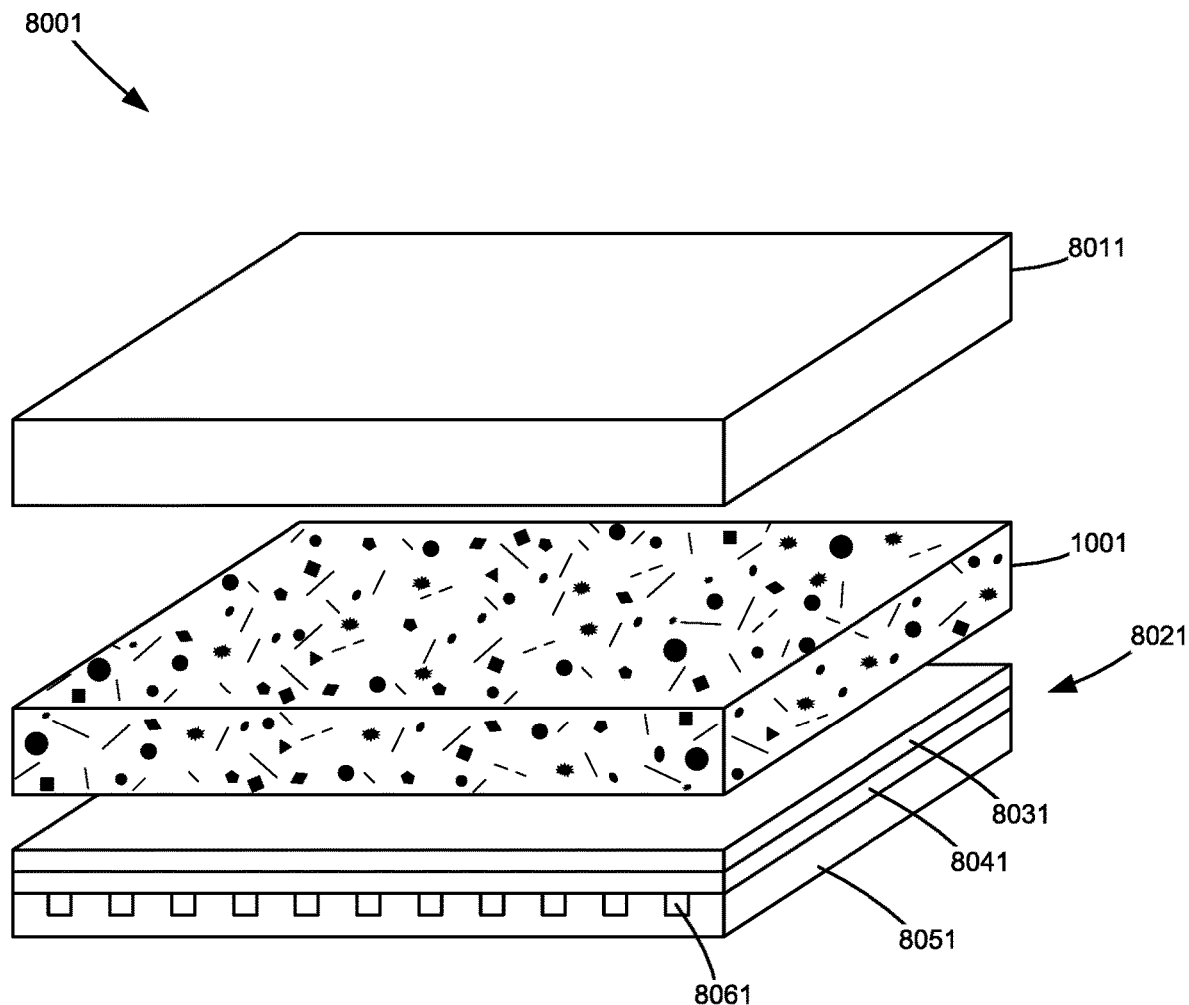

FIG. 8 shows a transducer pushing on a PUF with bonding of optional acoustic backer.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology, terminology and dimensions used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art. The dimensions of the magnetic particles, separations between particles and sensor locations are interrelated and can be proportionally scaled with respect to each other to provide different sized solutions.

The present invention is described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

The present invention is a diverse acoustical object containing a range of particles that have step changes of acoustical wave impedances that are substantially different from the binder. Table 1 shows the reflection coefficients of a number of materials that are in a plastic (e.g., Nylon, Polycarbonate, or other materials not shown like Polypropolene). The materials create a substantially different reflection as an acoustic wave is scattered by the particles. All of these materials will create a positive reflection due to the higher impedances. A negative reflection is created when the scattered wave is from a particle that has a wave impedance that is substantially less than the binder impedance. For negative reflections, a material such as Dow Corning Sylgard® 160 Silicone Elastomer or similar would be practical. It may be necessary to encase this material in a thin material that will withstand the fabrication process. Air or silicone elastomer could be encased in glass. If the wavelength is large compared to the encasing material thickness, then the reflection will be more dependent on the interior material. A mixture of materials that generate positive as well as negative reflections within the binder would add to the complexity of the PUF.

TABLE 1

Various Materials with Wave Impedance and Reflection Coefficients in Binder.

| Binder | Impedance $Z_0$ (MRayl) | Material | Particle Impedance $Z_1$ MRayl | $R = \dfrac{Z_1 - Z_0}{Z_1 + Z_0}$ |
| --- | --- | --- | --- | --- |
| Nylon | 2.9 | Glass Plate | 10.7 | 0.573529 |
| Nylon | 2.9 | Aluminum | 17.5 | 0.715686 |
| Nylon | 2.9 | Tin | 24 | 0.784387 |
| Nylon | 2.9 | Alumina | 25.5 | 0.795775 |
| Nylon | 2.9 | Brass | 33 | 0.83844 |
| Nylon | 2.9 | Iron | 40 | 0.864802 |
| Nylon | 2.9 | Copper | 41.6 | 0.869663 |
| Nylon | 2.9 | Nickel | 50 | 0.890359 |
| Nylon | 2.9 | Gold | 62.6 | 0.91145 |
| Polycarbonate | 2.77 | Glass Plate | 10.7 | 0.588716 |
| Polycarbonate | 2.77 | Aluminum | 17.5 | 0.72669 |
| Polycarbonate | 2.77 | Tin | 24 | 0.793052 |
| Polycarbonate | 2.77 | Alumina | 25.5 | 0.804033 |
| Polycarbonate | 2.77 | Brass | 33 | 0.845122 |
| Polycarbonate | 2.77 | Iron | 40 | 0.87047 |
| Polycarbonate | 2.77 | Copper | 41.6 | 0.875141 |
| Polycarbonate | 2.77 | Nickel | 50 | 0.895016 |
| Polycarbonate | 2.77 | Gold | 62.6 | 0.915252 |

FIG. 1 shows a rectangular slab of an acoustic PUF 1001 of dimensions 1021, 1031, and 1041 that contains particles 1011 with varying materials and shapes. The material shown inside the slab are shaped particles. The PUF has a distribution of shapes that respond differently to an acoustic wave. These 3-dimensional shapes created by various manufacturable processes that include cuboid, parallelepiped, polyhedron, cylinder, ellipsoid or other basic shapes. A mixture of a percentage any number of the materials listed in the Table 1 may be formed in the shapes. The different shape types in FIG. 1 represents a mixture of the materials and shapes selected to be in the matrix. Some particles may be like fractured glass 2011 that have that have a very irregular shape as shown within a bounding box 2001 in FIG. 2 of dimensions 2021, 2031, 2041. The fractured nature is a result of compressing, grinding, or milling during particle creation or as a result of the mixing or molding process. A desired result is particles with sharp edges or corners to create specific random reflection patterns.

The preferred PUF would have the minimum volume of particles of various materials to provide the unique value desired when measured by the transducer. Most sensors are flat on the surface, however some sensors may be manufactured of a flexible material. It is critical that the sensor has direct contact to the surface of the PUF to transmit the acoustic wave efficiently into the PUF. An acoustical gel may be temporally added to the surface of sensor and PUF to improve acoustic transmission. The overall preferred PUF shape would be rectangular as shown in FIG. 1. In the preferred embodiment, the height 1041 of the PUF shape is generally small compared to the length 1021 and width 1031 in order to minimize volume, but substantially larger than the maximum dimension of the particles. This allows all the particles to be contained within the slab and not protrude beyond the surface on the sensor measuring side.

The acoustic slab also has ranges of dimensions that are needed to work in application. The first requirement is that the surface area of the measurement location should be similar in size as the acoustic sensor. Given the loading ratio and particle sizes the surface area needs to be greater that 4 mm$^2$ but not exceed 625 mm$^2$. The preferred area should be between approximately between 100 mm$^2$ and 200 mm$^2$. The surface may be square, rectangular or any shape as long as the sensor can interface to a substantial area.

The preferred sensor would have a resolution necessary to recognize the basic edge characteristics of the closest particles at the surface. The image will have less resolution as the wave is dispersed by going through particles. The image will also be a function of the focal length of the sensor. The sensor's source frequency also influences the resolution of the image. Additionally, the processing software may act as an acoustic ultrasound to reconstruct not only the surface characteristic but interior uniqueness as well. This would add to the complexity of the PUF.

FIG. 2 also shows a bounding box 2001 with a given length, L, 2021; width, W, 2031; and height, H, 2041 that describes the rectangular volume within which a particle may be defined. The particle size has several characteristics that need to be considered. Particles need to be large enough that sensors can resolve the existence and variations of the wave front impending on the surface. Particles smaller that this sized can be used but present very little value to the system. Particles that are too large create problems with the manufacturing process during molding or extrusion. For these reasons, the maximum particle size should be less that 1 mm for the longest straight line within the bound box. The longest straight distance within the bounding box is between the two opposing vertices designated as: $P_{max} = \sqrt{H^2 + W^2 + L^2}$ where the particle just fits inside.

The preferred $P_{max}$ for most applications would be approximately 2 times the size of the sensor resolution or wavelength inside the binder material. The smallest dimension of the particle is the height, H, 2041 in FIG. 2. This dimension is preferred to be at least 0.1 times the acoustic wavelength within the binder material. Typical length, L, 2021 or width, W, 2031 would be 250 µm with a height of 50 µm for flake particles. Spherical particles would be from 100 µm to 500 µm in diameter.

The loading of the particles needs to be low enough that there is space between the particle to allow the binder to give the needed strength to hold the PUF together. There is also a desire to minimize the cost of the PUF and most of the particles cost significantly more than the binder. For these reasons, the maximum fill ratio by volume of particles should be below 50% by volume. The minimum fill ratio is needed to create an acoustic pattern complex enough to create a uniqueness that it is difficult to copy or randomly create a duplicate. The minimum loading should be greater than 1% by volume. The preferred range that balances the above and other factors is a range of loading greater than 10% by volume and less than 30% by volume. The ideal loading ratio should be approximately 20% by volume.

FIG. 3 shows one process 3001 for creating the moldable or extrudable PUF matrix material extruded 3111. Any reflective or absorbing material 3011 may be processed into particles 3051 by grinding, cutting or pulverizing 3021 into the range of said particle sizes. These particles are mixed with a binder 3041 that may be added in pellet form 3061. The binder 3041 may also contain other acoustic particles if desired. The combined particles are mixed in a container 3071 by a suitable device, such as a motor 3031 driven impeller 3081. The mixture is heated and combined through an extruder 3091 or similar equipment. The resulting output 3111 is the matrix that can be processed into a mold or extruded into an intermediate or final form.

The particles will minimally require use of a material with a substantially different acoustic impedance from the binder material. For example, binders of nylon and polycarbonate have acoustic impedances of 2.9 MRayls and 2.77 MRayls, respectively. The particles should have an acoustic impedance that is at least ±50% different than the binder impedance would be 1.45 MRayls and 4.35 MRayls for Nylon and 1.38 MRayls and 4.15 MRayls for polycarbonate. To create a larger reflection coefficient the preferred difference should be greater than ±200% times binder impedance. To add additional uniqueness factors, multiple particle material types can be combined following similar increases in refection coefficient multiplier steps in impedance from one particle type to another. For example, a good selection from Table 1 would be glass, aluminum, alumina and brass. This would create a PUF that would be extremely difficult or impossible to copy without placing the same number, type, shape and position of each particle within the slab.

Materials that exhibit other unique random characteristics may also be combined into the mixture. An example would be to have magnetic materials that can be magnetized creating a multi-characteristic PUF.

The acoustic slab may be bonded to any device that needs to be authenticated. A surface adhesive may be applied to the surface opposite to the measurement surface. The slab may have mechanical features like tabs or holes that allow it to be affixed to the desired product. The matrix may also be formed directly into the product be a combining process with other molding methods. The acoustic slab may be impacted by the attachment to the product. One countermeasure would be applying a backer material that has a different wave impedance to cause the majority of energy to be either reflected back into the slab or absorbed.

In another embodiment, a gas or liquid may be injected into the extruder show in FIG. 3. The gas or liquid may be any type that is compatible with particles or binder that does not displace too much of the binder making the load percentage too high that compromises the strength of the slab. If a liquid is injected, it is preferred that the liquid does not reach its boiling point during the extrusion or post processing phases.

In another embodiment, a transducer structure is presented that can measure multiple combination of physical characteristics using the same architecture. While the sensors discussed in the prior art referenced above only measure acoustic properties, sensors described in U.S. patent application Ser. No. 16/816,848, titled "Hall Effect Prism Sensor," filed on Mar. 12, 2020, which is incorporated herein by reference, incorporate the ability to measure an array of the magnetic field and capacitance of a PUF. With the addition of acoustical properties to a PUF, combinations of acoustic, capacitive and magnetic properties are desired to be measured using the same sensor.

The acoustic capability of the transducer structure can be added by applying a piezoelectric material, such as aluminum nitride, lithium niobite or similar materials, between two electrodes. Piezoelectric materials are those that will produce a charge potential in response to a varying mechanical force (the piezoelectric effect) and vice versa (inverse piezoelectric effect). Table A shows several types of common piezoelectric materials.

TABLE A

| Common Piezoelectric Materials |
| --- |
| Quartz |
| Berlinite |
| Topaz |
| Tourmaline |
| Cane Sugar |
| Rochelle Salt |
| Gallium Orthophosphate |
| Langasite |
| Barium titanate |
| Lead titanate |
| Lead zirconate titanate (PZT) |
| Lithium niobate |
| Lithium tantalite |
| Potassium niobate |
| Sodium tungstate |

For engineering applications, the piezoelectric effect makes them useful for accelerometers and grill ignitors; and, for the inverse piezoelectric effect, loud speakers.

In this disclosure, these properties are exploited for pairs of transducers on the micro or nano scale. One transducer producing the local input force in response to known input voltage to a point on the PUF, and the other producing the measured output voltage in response to the output force received from the PUF very close to that same point. While this arrangement is not unique (consider 50 MHz medical ultrasound), its use as a security authentication tool in ultrasonic PUF is unique.

FIG. 4 shows a cross section of a piezoelectric material 4051 with a conducting Hall plates 4041, 4042 above and capacitive conductor 4061, 4062 below forming a combined acoustic component sensor 4001. Also shown is an impedance matching dielectric 4031, a dielectric 4071, and an acoustic mass 4091. The source 4011 is applied by closing the switches 4021 and 4024, which applies a voltage or current source and electric field across the piezoelectric material causing an acoustic wave to penetrate the impedance matching dielectric 4031. The sensor 4001 is bought in contact with a PUF containing the acoustic materials as previously discussed. The source may be a step, sinusoidal chirp or continuous sine wave. The step and chirp are used for time domain responses to measure the reflections through the PUF. The continuous source is used to find the transfer function between a source and different receiving locations.

FIG. 4 also has multiple Hall plates 4041, 4042 on the same layer. In this figure, there is one to the left 4042 connected to 4021 and 4022 and one to the right that is connected through another switch matrix, not shown. The capacitance changes due to the PUF can be measured by closing switches 4021 and 4026. This step will apply a source to the Hall plate and bottom conductor electrode with respect to the substrate. This will cause an electric field from one Hall plate to the other without applying an electric current through the piezoelectric material. There will be an electric field coupling from the source to the substrate 4081, but this will be subtracted out by calibrating the capacitance out when no PUF is present. This is similar to the mechanism found in the previous disclosures. The capacitance can be measured by the impedance change to Hall effect plate 4042. The capacitance can also be found by measuring the signal found on Hall effect plate 4041 generated from the coupling from Hall effect plate 4042. Switches 4021, 4023 or 4025 will apply the top positive source connection to the Hall effect plate 4042, capacitive conductor 4062 or substrate 4081 respectively. Switches 4022, 4024 and 4026 will apply the bottom negative source connection to the Hall effect plate 4042, capacitive conductor 4062 or substrate 4081 respectively.

Additionally, the envisioned application disclosed proposes a more complex arrangement than previously known in the art. For the acoustic aspect of the transducers, it is desired to have them operate as in FIG. 5 which shows an asymmetric stack 5001 of piezoelectric materials of differing material types and the same or differing thicknesses: a first piezoelectric material 5021 of a first thickness 5022; a second piezoelectric material 5031 of a second thickness 5032; a third piezoelectric material 5041 of a third thickness 5042; and a fourth piezoelectric material 5051 of a fourth thickness 5052. Additional layers may be added. Each layer may be between 5 microns and 500 microns. The number of layers proposed is between 1 and 50. The minimum length and width of the layer should be between 1 and 500 microns. Additionally, the cross section could be of a different shape such as circular (instead of square as shown).

Between each layer and at the end of each layer is a previously discussed Hall Effect/capacitive sensor plates 5011, 5012, 5013, 5014, 5015. Those plates may have different material types and thicknesses to produce different masses. The assembled embodiment shown may be thought of as a series of connected axial stiffnesses from the piezoelectric layers and masses from the plates.

Even though these are pairs (transmitter/receiver), it is not required that each of the pair match although that may be most beneficial. They may have a different number of layers than one another, and be constructed from different materials, and employ different materials on the end plates. The materials on the end plates may be used for capacitance alone, Hall Effect alone, or a combination thereof.

Such an assembly has several resonance frequencies associated with it and consequently, a complex pattern of frequency response. This response pattern, or frequency response function, may be excited with a time-varying voltage to produce a similar time-varying stress input. Exciting it at one or more of the transducers (or PUFs) resonance frequencies may also reduce the need for electrical power input to the emitter.

Once the generated ultrasonic waves are in the PUF, they are altered, scattered, absorbed and reflected as discussed previously. The receiver will then respond electrically in accordance to the scattered stress input from the PUF element. Certain frequency components present in the received mechanical stress will be altered according to the nature of the PUF and construction of the receiver's layers in a unique fashion. The nature of the layers, thicknesses, end plates may be tuned to optimize the operation of the pair, like a radio is tuned to respond to certain desired frequencies.

To minimize mechanical cross talk between the emitting transducer and receiving one of the pair, it is desired to choose the material to have a Poisson Ratio as close to zero as possible. Materials with low Poisson Ratio will have very little lateral strain compared to axial strain. It is the lateral strain that will disturb the other receiving transducer of the pair so it is desired that it be minimized.

While only one pair of transducers is shown in FIG. 4. The pairs of transducers are at the micro or nano scale (length and width) so to practically implement a scanning tool, the transducers should be constructed in an array, that could be a linear array, square array, circular array, or other chosen shape or pattern for the macro sized resultant sensor.

FIG. 6 shows a schematic of a Hall effect sensor 6001 of a Hall effect plate 6041 with four terminals 6042, 6043, 6044, and 6045 that is excited and measured for finding the magnetic field by closing switches 6021, 6022, 6024, and 6025. The source 6011 is on the left designated with V or I and the receiver measurement 6031 is on the right. As a source electrode for the capacitance or acoustic measurement switches 6021 and 6023 are closed. In this mode, another Hall effect plate sensing electrode (not shown) that would preferably be adjacent to the source with closed switches 6024 and 6026 to measure the received voltage or current on the adjacent Hall effect plate. The substrate or ground plane 6051 of the system is shown.

A filler material or vacuum 4045, 4065 between the Hall plates 4041, 4042 or conductors 4061, 4062 in FIG. 4 reduces cross acoustical interference. The optional acoustical mass 4091 is any high-density material like steel, copper, gold or zinc is used to help direct the acoustical energy upward.

FIG. 7 is a similar sensor 7001 to the one shown in FIG. 4 with an impedance matching dielectric 7011, Hall plates 7021, 7022, piezoelectric material 7031, 7032, conductor plates 7041, 7042, dielectric 7051, 7052, a substrate 7061, and acoustic mass 7071, but with an isolation area 7081 between the sensor sections.

One skilled in the art could vary the construction in many ways to add or subtract extraneous elements. A key sensor aspect is the ability to substantially isolate the different function from interacting by energizing the functions one at a time. By eliminating selected switches, the sensor can function in any combination of acoustic, Hall effect or capacitive sensing to reduce the complexity or cost.

In another embodiment, an acoustic backer is bonded or incorporated to the PUF that can perform as an acoustic mass to reflect the sensor waved back to the sensors. The acoustic mass may also be an absorber to reduce the reflections is desired.

In another embodiment, the PUF object may be incorporated into a credit card or any form factor such that sensors may be located on two sides of the PUF matrix. With this configuration, the transmission characteristics can also be measured through the PUF object.

In FIG. 8 system 8001, the optional acoustic mass or absorber 8011 is replaced with another sensor, and with the acoustic transducer 8021, the acoustic transfer function or characteristics can be interrogated. The representative sensor assembly 8021 is an array of sensors 4001, 7001 or similar. The top layer of 8021 is an impedance matching dielectric 8031 which is the same as 4031 in FIG. 4. The layer below 8031 is the piezoelectric material 8041 which is the same as 4051 but Hall effect plate 4041 is not show. The next layer down is the substrate 8051 which is the same as 4081. The cell 8061 inside of the substrate 8051 is the capacitive conductor which is the same as 4061. Not shown is the bottom acoustic mass 4091 or dielectic layer 4071. It is to be understood that the composition of 8021 will be different depending on the desired features and functional requirements of the acoustic or capacitive sensing. To measure the PUF object 1001 the sensor 8021 is brought into contact with the PUF. If desired the acoustical mass or absorber 8011 is also brought in contact with the PUF with some force. If there are sensors on both sides of the PUF, the magnetic Hall effect, acoustic and capacitive then the transfer characteristics can be measured in any combination. The acoustic PUF object 1001 may be inserted or swiped over one or more sensors that are in tandem, parallel, adjacent or opposite sides depending on the geometry of the PUF object.

After sensing the PUF characteristic, the resulting data can be analyzed for its unique characteristics and stored for later comparisons for validations. This data can be stored in the cloud, remote or locally in memory devices or optically in a Quick Response (QR) code for example. Many different recognition methods may be used recognize the critical characteristic to authenticate the PUF object.

We claim:

1. An acoustic Physically Unclonable Function (PUF) object with a predetermined acoustic profile comprising:
   a binder material;
   particles that have an acoustic impedance that is at least 50% different than the binder, wherein the particles respond differently to an acoustic wave.

2. The acoustic object of claim 1, wherein the particle have a defined shape.

3. The acoustic object of claim 2, wherein the particle shapes, including cuboid, parallelepiped, polyhedron, cylinder, ellipsoid, or other basic geometric shapes.

4. The acoustic object of claim 1, wherein the particles have a size measured by the longest dimension of the particle.

5. The acoustic object of claim 4, wherein the particle size is approximately two times the size of a sensor resolution inside the binder material.

6. The acoustic object of claim 1, wherein the binder is nylon or polycarbonate.

7. The acoustic object of claim 6, wherein the particle is glass, aluminum, tin, alumina, brass, iron, copper, nickel, or gold.

8. The acoustic object of claim 1, wherein a loading defined as a fill ratio of a volume of the particles to a volume of binder is greater than 1% by volume.

9. The acoustic object of claim 8, wherein the loading is greater than 10% by volume and less than 30% by volume.

10. The acoustic object of claim 9, wherein the loading is approximately 20% by volume.

11. A method of making an acoustical Physically Unclonable Function (PUF) object comprising:
    processing a reflective or an absorbing material into a particle form by grinding, cutting or pulverizing into a selected range of particle sizes;
    mixing the particles with a binder, wherein the binder may also contain other particles with known acoustic properties to form a mixture;
    heating the mixture to further combined the particles and binder in an extruder or similar equipment to form a matrix of particles and binder; and extruding the resulting matrix.

12. The method of claim 11, wherein magnetic materials that can be magnetized creating a multi-characteristic PUF are added to the mixture.

13. The method of claim 11, further comprising the step of extruding the matrix into an intermediate or final form.

14. The method of claim 13, wherein a mold is used to create the intermediate or final form.

* * * * *